United States Patent [19]

Reaux

[11] Patent Number: 4,658,860
[45] Date of Patent: Apr. 21, 1987

[54] PRESSURE SET AND RETRIEVABLE VENTED ANCHOR-SEAL FOR PIPELINE SERVICE

[76] Inventor: James R. Reaux, P.O. Box 2700, LaFayette, La. 70502

[21] Appl. No.: 710,443

[22] Filed: Mar. 11, 1985

[51] Int. Cl.[4] ............................................. F16L 55/12
[52] U.S. Cl. ........................................ 138/89; 138/97
[58] Field of Search ...................... 138/89, 90, 97, 93; 285/102; 405/170; 73/152, 756

[56] References Cited

U.S. PATENT DOCUMENTS

| | | | |
|---|---|---|---|
| 3,561,490 | 2/1971 | Little | 138/97 |
| 3,586,056 | 6/1971 | Kipp | 138/89 |
| 3,693,408 | 9/1972 | Hyde | 138/90 |
| 3,724,273 | 4/1973 | Awrey | 138/97 |
| 3,746,026 | 7/1973 | Herring | 138/89 |
| 3,751,932 | 8/1973 | Matthews, Jr. | 138/93 |
| 3,978,892 | 9/1976 | Scodino | 138/90 |
| 4,144,908 | 3/1979 | Dunn | 138/93 |
| 4,365,649 | 12/1982 | Jones | 138/93 |
| 4,373,381 | 2/1983 | Kulp et al. | 138/93 |
| 4,385,643 | 5/1983 | Noe | 138/90 |
| 4,413,655 | 11/1983 | Brown | 138/97 |
| 4,422,477 | 12/1983 | Wittman et al. | 138/89 |
| 4,452,070 | 6/1984 | Kipp | 138/89 |
| 4,498,811 | 2/1985 | Fern et al. | 138/89 |

Primary Examiner—Stephen Marcus
Assistant Examiner—Leo James Peters
Attorney, Agent, or Firm—William H. Maxwell

[57] ABSTRACT

A workman safety tool for use in the maintenance and repair of open pipelines, and comprising an anchor and a seal that are simultaneously operable and actuated by remote pressure application to ensure securement of the tool while work proceeds, with a pressure test plug and valve to determine and/or to release pressure before release of the tool.

20 Claims, 12 Drawing Figures

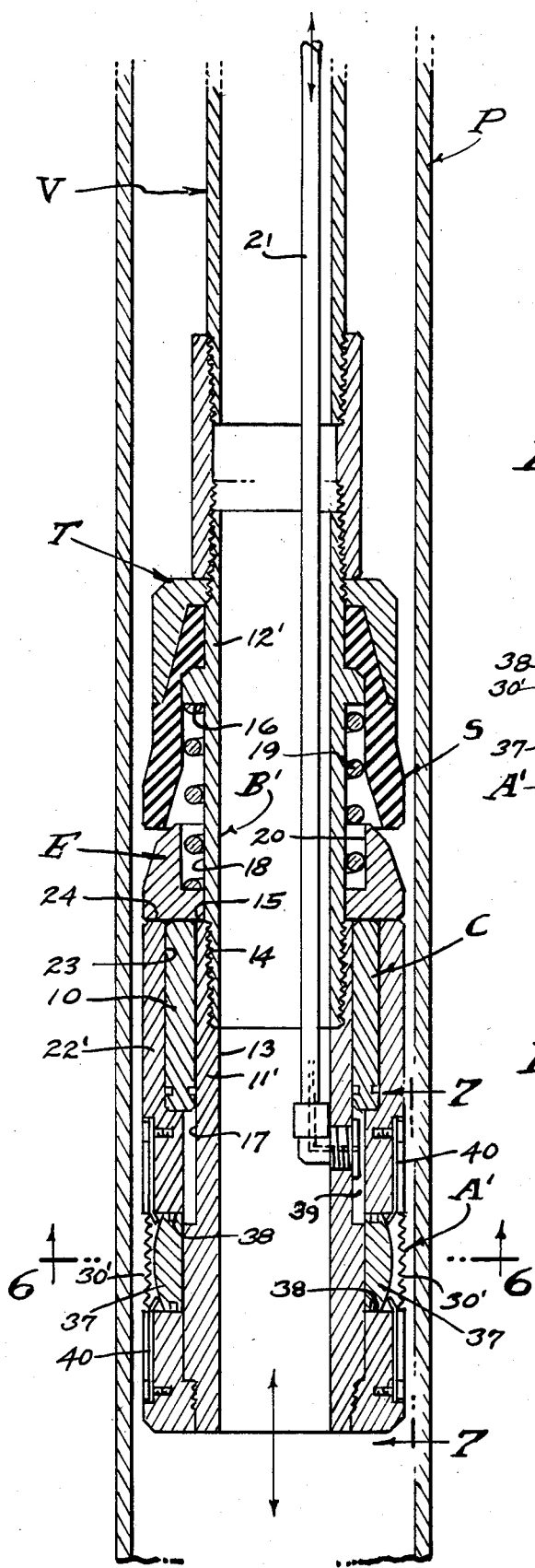
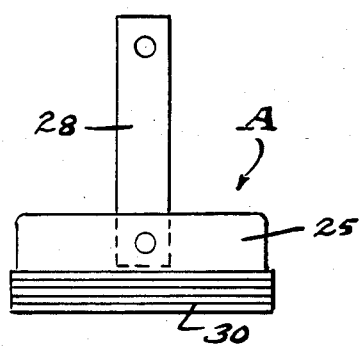
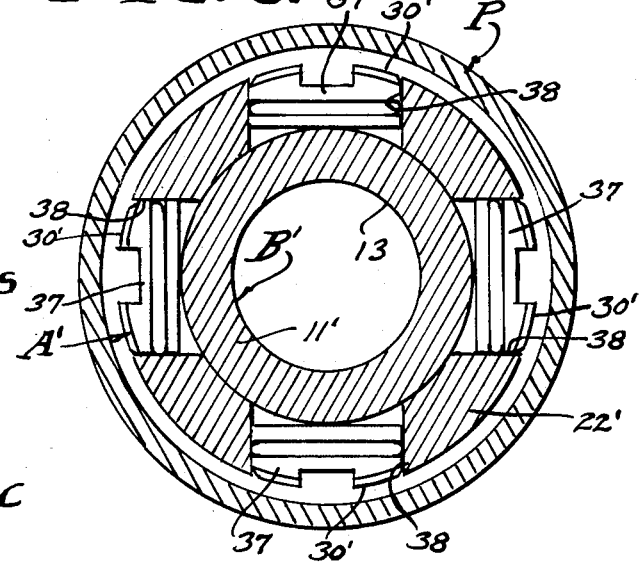
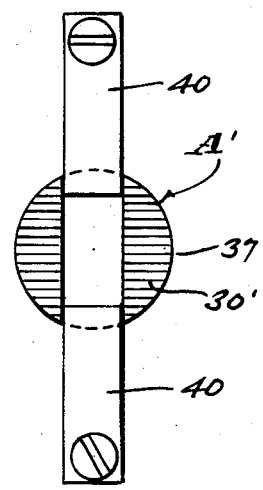

PRESSURE SET AND RETRIEVABLE VENTED ANCHOR-SEAL FOR PIPELINE SERVICE

BACKGROUND OF THE INVENTION

This invention relates to the maintenance and repair of pipelines that carry or supply fluid and which are subsurface, either underground or sub marine. Such pipelines extend horizontally and involve lateral connections as well as vertical standpipe and/or connections, and all of which require additions and deletion, maintenance and repair. Therefore, pipe line servicing requires cutting into and the replacement of sections of such pipelines which carry liquids or gas, many of which are dangerous; as such fluids may be toxic or volitile, or even in the case of water which may cause unwanted flooding. Prior art methods of pipeline servicing have involved the use of various types of plugs to close the open ends of pipelines during service. But the plug closures heretofore employed have not been alltogether reliable as they have been subject to displacement under fluid pressure build-up in the pipeline, and unexpected surges. It is therefore a general object of this invention to provide an anchor-seal that is adapted to be securely placed within a pipeline in a predetermined position before any hazardous work commences. With the present invention, a vented plug is releasably anchored and sealed within the pipeline by insertion to a placement which isolates fluids that remain behind said seal.

Heretofore, pipeline workman have devised ways to plug the open ends of pipelines, but which have been subject to failure. For example, filling the end of the pipe with rags and placing a cake of mud thereover as a seal. Or for example, inflating or expanding a plug within the end of the pipe for frictional sealed engagement therein. Invariably, such methods of pipeline closure are subject to failure, since such plugs are displaceable by relatively low differential pressure, in which case they ar either blown out of or down the pipe. Since pipeline servicing involves spark generating work proceedures such as grinding and cutting or welding with torches, a hazard exists when such a plug is moved or displaced. It is therefore an object of this invention to provide an effective anchor separate from a seal that plugs the pipeline opening, and an anchor and seal that are simultaneously operable through releasable means. In carrying out this invention, a pressure actuating means controllably sets and releases the anchor and seal. It is also an object to provide for remote control of the releasably set operation of this device. And it is still another object to remotely vent the pipeline behind the set device, whereby discharge of fluid under pressure can be remote form the working area. With the present invention the working environment is made safe, despite fluid discharge and changing pressure conditions that may occur in the pipeline during the servicing period.

SUMMARY OF THE INVENTION

Prior art plugs used for the purpose herein have been characterized by inflatable or otherwise expansible elastomer bodies which tend to slide out of working position. Purging of pipelines is an expensive and doubtful operation. And, the escape of volatile and noxious liquids and gases is hazardous. These disadvantages are eliminated with the Pressure Set And Retrievable Vented Anchor-Seal For Pipline Service as disclosed herein, in the form of a transportable and controllable tool by which the interior of the pipeline is isolated and/or vented as required to eliminate dangerous and unwanted fluids from the service area. In carrying out this invention there is a pressure actuating means that simultaneously expands anchor means and sealing means when controlled fluid pressure is applied, and that permits retraction of the anchor means and constriction of the sealing means when fluid pressure is controllably removed.

The foregoing and various other objects and features of this invention will be apparent and fully understood from the following detailed description of the typical preferred forms and applications thereof, throughout which description reference is made to the accompanying drawings.

FIG. 1 is a vertical sectional view showing the tool of the present invention in position within a standpipe preparatory to being set therein. FIGS. 2 and 3 are enlarged sectional views taken as indicated by lines 2—2 and 3—3 on FIG. 1. And FIG. 4 is a side view of an anchor member of the tool, removed therefrom, and taken as idicated by line 4—4 on FIG. 2.

FIG. 5 is a view similar to FIG. 1, showing a second embodiment of the tool. FIG. 6 is an enlarged sectional view taken as indicated by line 6—6 on FIG. 5. And, FIG. 7 is a side view of an anchor member of the tool, removed therefrom, and taken as indicated by line 7—7 on FIG. 5.

PREFERRED EMBODIMENT

Figures 1, 2, 3:
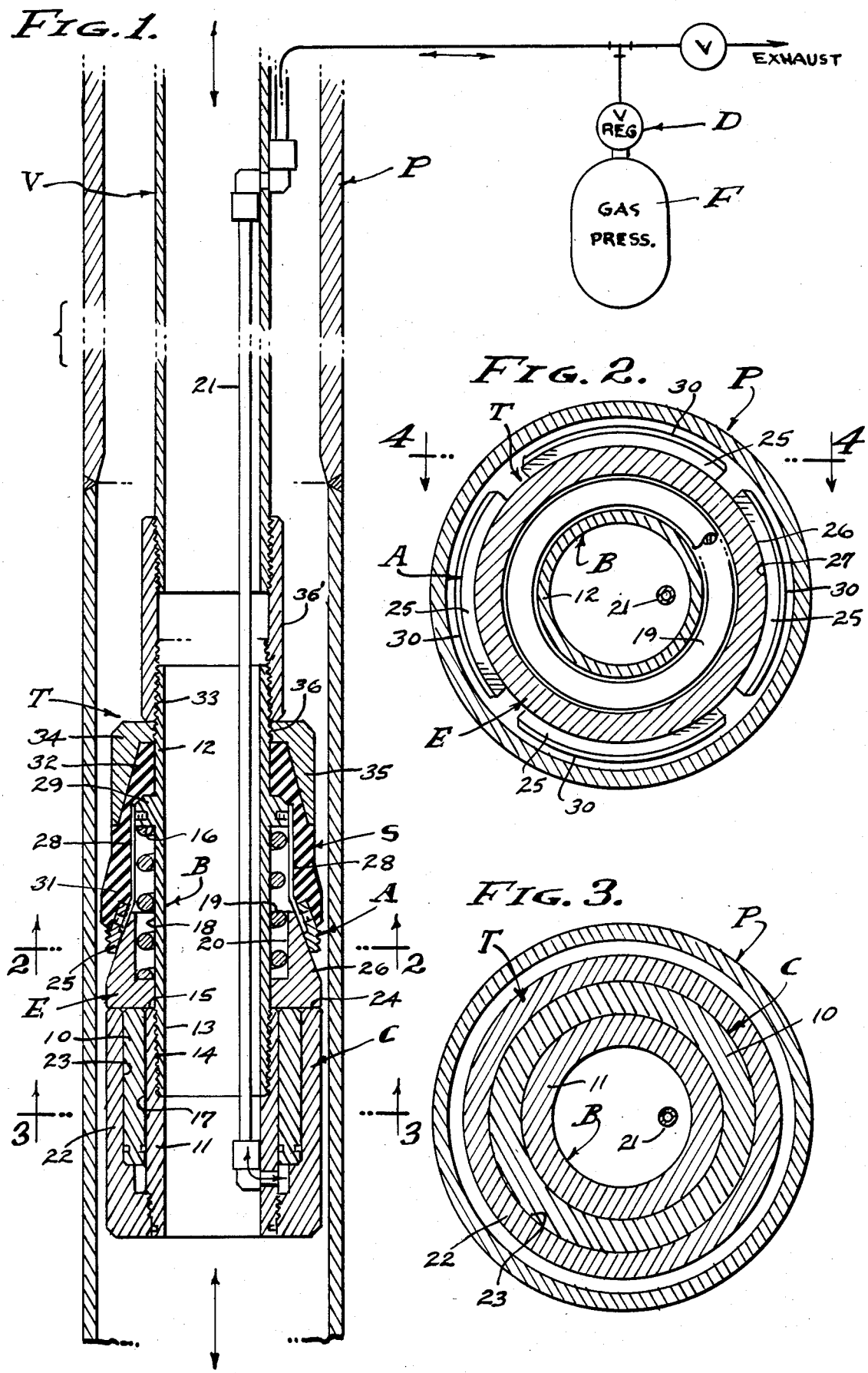

Referring now to the drawings, the service tool of the present invention is shown as it would be installed in a standpipe, or the like, in which case the tool T is vertically disposed and operable to be anchored within an open standpipe P at a selected depth below the work to be performed, where it seals with the inner diameter wall of the standpipe. This service tool T comprises, generally, a body B that carries anchor means A (A') and seal means S operated by pressure actuating means C, and a vent V extending to a remote position outside the open standpipe where control means D of the tool is located. It is to be understood that the magnitude of vertical, or horizontal, or other angular extension of vent V can vary as circumstances require, the length of the vent V serving as a means to locate the position of the anchor means A (A') and seal means S. It is also to be understood that the effective engagement diameter of the anchor means and seal means is selected to accomodate standard pipe diameters and wall thicknesses which may vary according to specification; for example to accomodate the differing wall thicknesses of schedule 40 or 80 pipe.

The body B of tool T is basically the same in both embodiments disclosed, and is preferably sectional so as to reciprocably capture the actuating collar E that expands or dilates the seal means S and in the first form simultaneously actuates the anchor means A. The body B also incorporates features of the actuating means C that operates the collar E in both embodiments disclosed, or it carries the anchor means A' separately from the seal means S in the second embodiment disclosed. In both of the embodiments disclosed the pressure actuating means C simultaneously operates the anchor means and seal means, and it involves a cylinder and piston 10 that lifts the actuating collar E in response to the application of fluid pressure from control means D which is preferably a portable valve controlled hydraulic liquid pressure pump or reservoir as is indicated. In accordance with this invention, the body B is tubular so as to open internally into the standpipe and has an anchor section 11 and a seal section 12. In practice, sections 11 and 12 are separable so as to present spaced axially opposed shoulders between which the actuating collar E reciprocably operates. The body section 11 carries the cylinder and piston 10 that reciprocates the actuating collar E. And, the body section 12 carries said collar E and the seal means S that it expands or dilates.

The body B sections 11 and 12 have a common inner diameter bore 13 and they are threadedly engaged at 14 where the lowermost section 11 presents an upwardly faced shoulder 15 opposed to an axially spaced downwardly face shoulder 16 on the body section 12. The outer diameter wall 17 of section 11 is turned concentrically to slideably carry the inner diameter of piston 10, and the outer diameter wall 18 of section 12 is cylindrically turned concentrically to slideably carry the actuating collar E and to accomodate a return spring 19 operating between said collar and the shoulder 16. The spring 19 is seated within a counterbore 20 in the collar, and seated against shoulder 16. The spring 19 yieldingly holds the actuating collar E against shoulder 15 for stopped release of anchor means A and seal means S.

The pressure actuating means C is preferably hydraulic and comprises a passage or fluid pressure line 21 from a valve controlled fluid pressure source and reservoir means F, and the cylinder and piston 10 operating over the outer diameter wall 17 of body section 11. In accordance with this invention, the piston 10 is an annular member of right cylinder form that operates within the annulus of a cylinder 22 carried concentrically over the body section 11. Accordingly cylinder 22 has a turned bore 23 to slideably engage the outer diameter of piston 10. The inner and outer diameters of piston 10 are sealed as shown, and the line 21 opens into and exhausts from the lower end of the annulus to raise the piston by the admission of fluid under pressure and to permit lowering of the piston when fluid is exhausted. In practice, the cylinder 22 is a separate member threaded onto the body section 11 at the lowermost end thereof, and the upper face 24 of the cylinder is coincidental with the shoulder 15 to stop the actuating collar E. Thus, the piston 10 with its upper face engaged with the lower face of the collar E will raise the collar when required, and alternately permit it to stop in a released position held by the spring 19.

Referring now to the anchor means A of the first embodiment, I provide at least one and preferably a plurality of equally circumferentially spaced jaws 25 carried by the body B and operable radially into expanded pressured engagement with the inner diameter wall of the standpipe P. It is the actuating collar E that shifts the jaws 25 radially, and in accordance with the first embodiment, the exterior of the actuating collar E is an upwardly and inwardly tapered cone 26 that presents a wedge upon which an interface 27 of each jaw 25 is slideable. The jaws 25 are axially positioned by a retracting leaf spring 28 that is mounted to an abutment 29 of the body section 12, located at the shoulder 16, there being a spring 28 carrying each jaw 25. The jaw 25 is essentially a wedge, arcuate in transverse cross sectional configuration, and having circumferentially disposed teeth 30 to grip within the standpipe. When the actuating collar E is raised by the admission of fluid pressure into the annulus of cylinder 22, the jaws move outwardly to grip within the standpipe P thereby securely anchoring the tool T.

Referring now to the seal means S, and the first embodiment, I provide an expansible cup and preferably a downwardly open cup 31 of elastomeric material embracing the abutment 29 and into which the tapered cone 26 is adapted to engageably enter. In its relaxed unactuated condition, the cup 31 has a downwardly open peripheral lip of about the outside diameter of the cylinder 22 hereinabove described; the maximum diameter of the unactuated tool T. As shown, the cup 31 faces downwardly with its base 32 engaged over an upper extension 33 of the body B, where it is captured by a nut 34. In practice, the nut 34 is also cup-shaped and faced or opened downwardly to present a protective skirt 35 overlying the elastomer body of the cup 31. Thus, the base of the nut threaded onto the body extension 33 at 36 captures the cup 31 onto the abutment 29. When the actuating collar E is raised as above described to actuate the anchor means A, the tapered cone 26 enters into the cup 31 to expand and/or dilate it into pressured engagement with the inner diameter wall of the standpipe P, thereby sealing the annulus established by the tool T. The nut 34 is locked by a coupling 36' threaded onto the extension 33 and 36 to carry the vent V.

The vent V is a tubular continuation of the body B, and it is threaded onto the coupling 36' to extend any practical distance, as circumstances require. In practice, the vent V can be open at its upper or outer end, or it can be closed by a valve or the like. A feature is that the passage or line 21 is accessible at or through the vent tube for coupled engagement with the controlled fluid pressure source and reservoir means F, as shown.

In the first embodiment as shown in FIGS. 1–4, the jaws 25 and springs 28 are embraced by the cup 31 into which the tapered cone 26 of collar E enters to cause simultaneous expansion of the jaws 25 and cup 31. As shown, the anchored portion of each jaw 25 is accomodated within a cavity molded within the cup 31, while the teeth 30 thereof are exposed beneath the cup 31 for engagement with the inner diameter wall of the standpipe P.

Referring now to the second embodiment shown in FIGS. 5–7, the lowermost section 11' of body B' is elongated to accomodate the anchor means A' which is characterized by radially expansible anchor buttons 37 operating in cylinders 38; otherwise the tool T is the same as above described. There is a cylinder body 22' in the form of a separate member extended over a complementary lower end portion of the body section 11' and threaded thereto at the lowermost end thereof. The bore 13 continues through the extended lower end portion of the body section 11' to open into the standpipe P as above described, said lower end portion of section 11' being imperforate and with an outer turned wall at or about the same diameter as the turned wall 17 that carries the piston 10. The cylinder body 22' is provided with at least one and preferably a plurality of equally circumferentially spaced radially disposed cylinder openings or cylinders 38, in which each has an anchor button 37 slideable therein and sealed as shown to be operable radially into pressured engagement with the inner diameter wall of the standpipe P. As shown, the line 21 opens into each of the cylinders 38 via a passage as at 39 so that fluid pressure is applied to and withdrawn from beneath each piston-button 37. The buttons 37 have circumferentially disposed teeth 30' to grip within the standpipe, said disposition being maintained by one or a pair of return leaf springs 40 secured into the cylinder body 22' and secured by screw fasteners as shown. It will be apparent that the anchor means A' and seal means S' operate simultaneously in response to the application and withdrawal of fluid pressure applied through line 21 and passages at 39.

Figure 8:
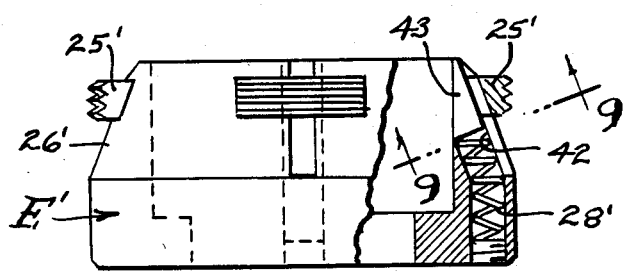
FIG. 8 is a side elevation of a modified actuating collar, removed from the tool. And, FIG. 9 is an enlarged sectional view of an anchor wedge taken as indicated by line 9—9 on FIG. 8.
Figure 9:
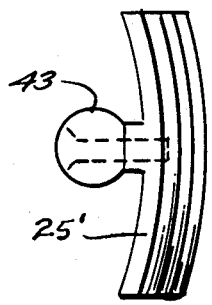

In FIGS. 8–9 of the drawings I have shown a modified actuating collar E', wherein the anchor wedge or wedges 25' are slideably mounted to guideways 42 formed in the conical portion 26', and returned to a retracted position by a return spring 28' carried in the collar. The guideway 42 is inclined downwardly and outwardly, and is comprised of a slot through which a guide carries the wedge, there being an enlarged plug 43 of cylinder-form that slides in the cylindrical guideway 42 beneath and coextensive with the slot. The return spring 28' is a coil spring acting under compression in the guideway 42 to engage and retract the wedge 25' upwardly and inwardly.

Figure 10:
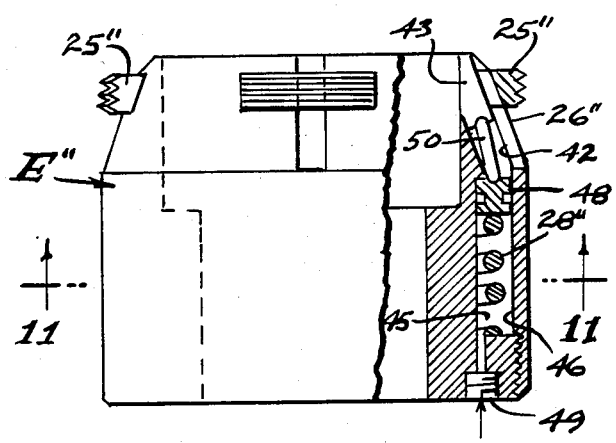
FIG. 10 is a side elevation of a modified actuating collar, removed from the tool, And, FIG. 11 is a sectional view taken as indicated by line 11—11 on FIG. 10.
Figure 11:
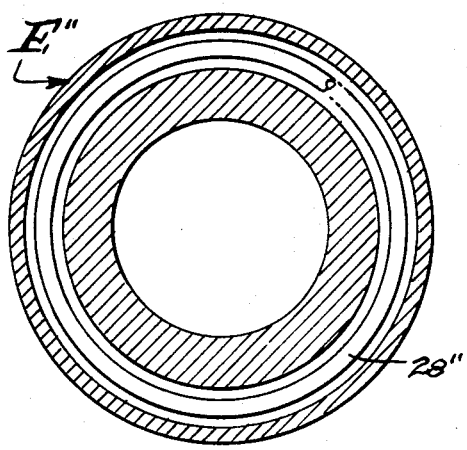

In FIGS. 10–11, of the drawings I have shown another modified actuating collar E", wherein the anchor wedge or wedges 25" are slideably mounted to guideways 42 formed in the conical portion 26", and returned to a retracted position by a return spring 28" and/or by a compressed gas charge 45, all of which is carried in the collar. The guideway 42 is inclined downwardly and outwardly, and is comprised of a slot through which a guide carries the wedge, there being an enlarged plug 43 of cylinder form that slides in a cylindrical guideway 42 beneath and coextensive with the slot. The return spring 28' is a compression coil spring carried in an annular cylinder 46 formed in the collar, and in which an annular piston 48 is yieldingly urged upwardly by said spring 28" and/or by a compressed gas charge in the cylinder. The gas charge is introduced into the cylinder through a check valve 49. Axial reciprocal motion of the piston 48 is transmitted to the wedge or wedges 25" through a link 50, in each instance.

Figure 12:
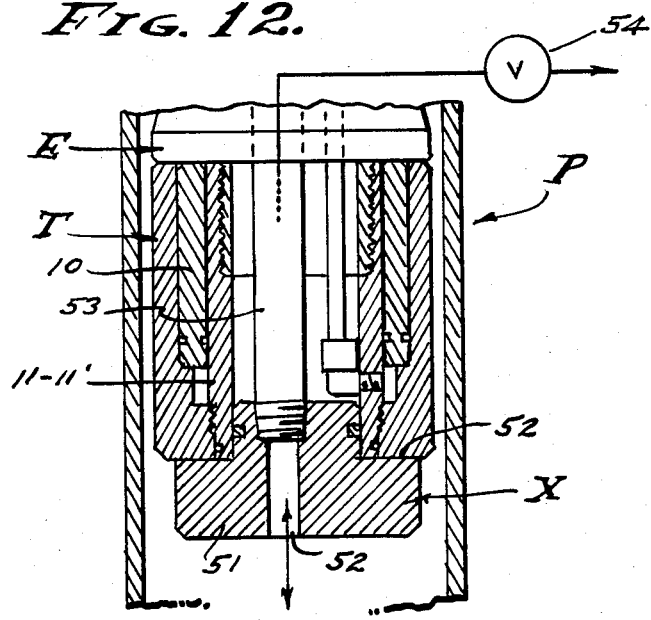
FIG. 12 is a fragmentary view of the lower end portion of the tool with the test plug and valve applied.

In FIG. 12 of the drawings I have shown a test means X, used to ascertain whether pressure exists below the system or tool T prior to release of the anchor means A (A') and seal means S (S'). As shown, the test means X is comprised of a cap 51 pressed into and sealed with the open bottom end of the body section 11 (11') and with a shoulder 52 to stop thereagainst. The cap 51 is ported into the the standpipe P at 52, and there is a line 53 extending from said port to an accesible test valve 54, or the like, that can be opened as requried to test the pressure in the standpipe P below or beyond the tool T.

From the foregoing it will be seen that I have provided a practical tool for ensuring workman safety in the maintenance and repair of pipelines that carry dangerous fluid. The actuating fluid pressure that operates the anchor means and seal means can be substantial, and to the end that considerable pressure within the pipeline can be withstood without concern. Alternately, the interior of the pipeline can be vented or sealed off as may be required; and in the event of a sealed-off condition the test plug and valve means is operable to determine a safe condition before release of the tool.

Having described only the typical preferred forms and applications of my invention, I do not wish to be limited or restricted to the specific details herein set forth, but wish to reserve to myself any modifications or variations that may appear to those skilled in the art as set forth within the limits of the following claims.

I claim:

1. A servicing tool for work areas of opened pipelines that carry dangerous fluids and require additions and deletions, maintenance and repair, and including;
    a tubular body for insertion into an open end of a pipeline to be serviced and comprised of a pair of axially adjacent sections with unobstructed inner diameter bores continuing one into the other and in open communication into the pipeline,
    a radially expansible cup-shaped elastomer seal attached to one section of the tubular body and having a peripheral lip diameter normally clearing the inside diameter of the pipeline,
    A conically tapered mandrel slideably carried on said one body section to retractably enter within the peripheral lip of the cup-shaped elastomer seal to expand the same,
    a cylinder and piston means carried by the tubular body where the sections thereof are joined and operable to shift the mandrel to enter within and thereby expand the lip of the elastomer seal radially into pressured engagement with the inside diameter of the pipeline,
    a pressure actuated anchor means carried by the tubular body and having jaws normally clearing the inside diameter of the pipeline and radially shiftable into pressured engagement therewith,
    control means remote from the body and comprised of a fluid pressure line both to the cylinder and piston means and to the anchor means for simultaneous actuation thereof,
    and a vent in the form of a tubular continuation of the tubular body and having an unobstructed inner diameter bore in open communication with the inner diameter bores of the body and extending therefrom, said vent opening from the seal and opened end of the pipeline to carry off dangerous fluids.

2. The servicing tool for opened pipelines as set forth in claim 1, wherein there is a shoulder where the tubular body sections are joined and said shoulder engaged by and to stop retraction of the mandrel, there being a spring seated against said one body section and against the mandrel to retract said mandrel.

3. The servicing tool for opened pipelines as set forth in claim 1, wherein the cylinder and piston means is comprised of a cylinder surrounding the other one of said body sections to form an annulus and of an annular piston operable therein to shift the mandrel.

4. The servicing tool for opened pipelines as set forth in claim 1, wherein there is a shoulder where the tubular body sections are joined and said shoulder engaged by and to stop retraction of the mandrel, and wherein the cylinder and piston means is comprised of a cylinder surrounding the other one of said body sections to form an annulus and of an annular piston operable therein and with an exposed face retractile to said shoulder, there being a spring seated against said one body section and against the mandrel to retract said mandrel for engagement with the face of the annular piston and to be shifted thereby when fluid pressure is applied thereto.

5. The servicing tool for opened pipelines as set forth in claim 1, wherein the pressure line of the control means extends through the tubular vent.

6. The servicing tool for opened pipelines as set forth in claim 1, wherein the inner diameter bores of the tubular body sections are closed by a plug having a valve controlled line extending remotely therefrom, for closing off pipeline fluids and subject to being tested for pressure.

7. A servicing tool for work areas of opened pipelines that carry dangerous fluids and require additions and deletions, maintenance and repair, and including;
   a tubular body for insertion into an open end of a pipeline to be serviced and comprised of a pair of axially adjacent sections with unobstructed inner diameter bores continuing one into the other and in open communication into the pipeline,
   a radially expansible cup-shaped elastomer seal attached to one section of the tubular body and having a peripheral lip diameter normally clearing the inside diameter of the pipeline,
   a conically tapered mandrel slideably carried on said one body section to retractably enter within the peripheral lip of the cup-shaped elastomer seal to expand the same,
   a cylinder and piston means carried by the tublar body where the sections thereof are joined and operable to shift the mandrel to enter within and thereby expand the lip of the elastomer seal radially into pressured enagement with the inside diameter of the pipeline.
   a pressure actuated anchor means carried by the tubular body and having jaws engaged on the tapered mandrel and normally clearing the inside diameter of the pipeline and radially shiftable into pressured engagement therewith by movement of the mandrel,
   control means remote from the body and comprised of a fluid pressure line to the cylinder and piston means for movement of the mandrel and for simultaneous actuation of the elastomer seal and the anchor means,
   and a vent in the form of a tubular continuation of the tubular body and having an unobstructed inner diameter bore in open communication with the inner diameter bores of the body and extending therefrom, said vent opening from the seal and opened end of the pipeline to carry off dangerous fluids.

8. The servicing tool for opened pipelines as set forth in claim 7, wherein there is a shoulder where the tubular body sections are joined and said shoulder engaged by and to stop retraction of the mandrel, there being a spring seated against said one body section and against the mandrel to retract said mandrel.

9. The servicing tool for opened pipelines as set forth in claim 7, wherein the cylinder and piston means is comprised of a cylinder surrounding the other one of said body sections to form an annulus and of an annular piston operable therein to shift the mandrel.

10. The servicing tool for opened pipelines as set forth in claim 7 wherein there is a shoulder where the tubular body sections are joined and said shoulder engaged by an to stop retraction of the mandrel, and wherein the cylinder and piston means is comprised of a cylinder surrounding the other one of said body sections to form an annulus and of an annular piston operable therein and with an exposed face retractile to said shoulder, there being a spring seated against said one body section and against the mandrel to retract said mandrel for engagement with the face of the annular piston and to be shifted thereby when fluid pressure is applied thereto.

11. The servicing tool for opened pipelines as set forth in claim 7, wherein the jaws of the anchor means are carried by leaf springs anchored to said one of said tubular body sections, and positioned thereby for spring retraction.

12. The servicing tool for opened pipelines as set forth in claim 7, wherein the jaws of the anchor means are carried by guideways in the conically tapered mandrel, with spring retraction means in the guideways yieldingly urging the jaws to a smaller end of the mandrel.

13. The servicing tool for opened pipelines as set forth in claim 7, wherein the jaws of the anchor means are carried by guideways in the conically tapered mandrel, and wherein an annular piston within the mandrel is coupled to the jaws, with spring retraction means yieldingly urging the piston and jaws to a smaller end of the mandrel.

14. The servicing tool for opened pipelines as set forth in claim 7, wherein the jaws of the anchor means are carried by guideways in the conically tapered mandrel, and wherein an annular piston within the mandrel is coupled to the jaws, with a gas charge in the mandrel yieldingly urging the piston and the jaws to a smaller end of the mandrel.

15. A servicing tool for work areas of opened pipelines that carry dangerous fluids and require additions and deletions, maintenance and repair, and including;
   a tubular body for insertion into an open end of a pipeline to be serviced and comprised of a pair of axially adjacent sections with unobstructed inner diameter bores continuing one into the other and in open communication into the pipeline,
   a radially expansive cup-shaped elastomer seal attached to one section of the tubular body and having a peripheral lip diameter normally clearing the inside diameter of the pipeline,
   a conically tapered mandrel slideably carried on said one body section to retractably enter within the peripheral lip of the cup-shaped elastomer seal to expand the same,
   an axially disposed cylinder and piston means carried by the tubular body where the sections thereof are joined and operable to shift the mandrel to enter within and thereby expand the lip of the elastomer seal radially into pressured engagement with the inside diameter of the pipeline,
   a "pressure actuated" anchor means carried on the other one of said tubular body sections and comprising radially shiftable piston jaws normally clearing the inside diameter of the pipeline and moveable into pressured engagement therewith,
   control means remote from the body and comprised of a fluid pressure line both to the axially disposed cylinder and piston means and to radially disposed cylinders carrying the piston jaws of the anchor means for simultaneous actuation of the elastomer seal and the anchor means,
   and a vent in the form of a tubular continuation of the tubular body and having an unobstructed inner diameter bore in open communication with the inner diameter bores of the body and extending therefrom, said vent opening remote from the seal and opened end of the pipeline to carry off dangerous fluids.

16. The servicing tool for opened pipelines as set forth in claim 15, wherein there is a shoulder where the tubular body sections are joined and said shoulder engaged by and to stop retraction of the mandrel, there being a spring seated against said one body section and against the mandrel to retract said mandrel.

17. The servicing tool for opened pipelines as set forth in claim 15, wherein the cylinder and piston means is comprised of a cylinder surrounding the other one of said body sections to form an annulus and of an annular piston operable therein to shift the mandrel.

18. The servicing tool for opened pipelines as set forth in claim 15, wherein there is a shoulder where the tubular body sections are joined and said shoulder engaged by and to stop retraction of the mandrel, and wherein the cylinder and piston means is comprised of a cylinder surrounding the other one of said body sections to form an annulus and of an annular piston operable therein and with an exposed face retractile to said shoulder, there being a spring seated against said one body section and against the mandrel to retract said mandrel for engagement with the face of the annular piston and to be shifted thereby when fluid pressure is applied thereto.

19. The servicing tool for opened pipelines as set forth in claim 15, wherein the radially shiftable piston jaws are retained by leaf springs anchored to said other one of said tubular body sections, and positioned thereby for spring retraction.

20. The servicing tool for opened pipelines as set forth in claim 15 wherein the inner diameter bores of the tubular body sections are closed by a plug having a valve controlled line extending remotely therefrom, for closing off pipeline fluids and subject to being tested for pressure.

* * * * *